Figure 1:
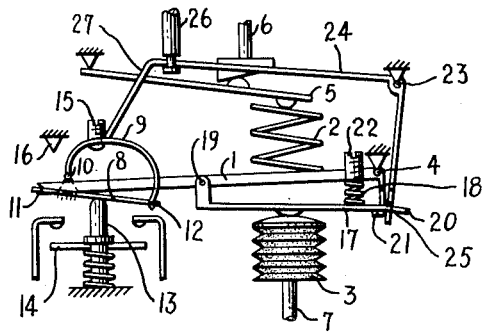

United States Patent Office 3,160,725
Patented Dec. 8, 1964

3,160,725
THERMOSTAT WITH ADJUSTABLE TEMPERATURE RANGE AND COMBINED SEMI-AUTOMATIC OPERATOR
Klaus Bille-Knudsen, Sonderborg, Denmark, assignor to Danfoss ved ing. M. Clausen, Nordborg, Denmark, a company of Denmark
Filed May 7, 1962, Ser. No. 192,825
8 Claims. (Cl. 200—140)

This invention relates to an evaporator thermostat with an adjustable temperature range and a combined semi-automatic defrosting device.

In practice it is usual to combine an evaporator thermostat with a semi-automatic defrosting device by means of which, upon depressing a defrosting button, the cut-in temperature of the thermostatic switch is increased to a temperature above zero. Having reached that temperature, the compressor of the refrigerating plant is switched on again, and the evaporator thermostat resumes normal operation.

Formerly, switching over of the evaporator thermostat to defrosting was accomplished by coupling an additional spring to the adjustment spring in such a way that both springs were active during the defrosting period. This coupling did not prove satisfactory, however, when the evaporator thermostat was adjusted to a fixed temperature for normal operation. When the temperature range of the evaporator thermostat is adjustable, it will no longer be possible, because the forces of the two springs are acting together, to obtain a fixed defrosting temperature of, for example, plus 6° C. at all settings of the evaporator thermostat. An attempt to remedy this problem was made by adjusting the auxiliary spring, along with the adjustment of the adjustment spring required for change of temperature, but in the opposite direction. Still, this procedure was found to require a most exacting matching of the adjustment spring and the auxiliary spring, especially with a vew to linearity and steepness of the spring characteristics. In general, this matching will be possible only in the case of narrow temperature ranges. For most purposes, springs matched together under tight tolerances will be too expensive. Further, the temperature coefficient will have a harmful influence upon matching. Also, the matching will be upset by the adjustment frequently required and the complete spring system will have to be replaced. Last but not least, a device for adjustment of the auxiliary spring in a direction opposite that of the adjustment spring is comparatively expensive, and in the case of an evaporator thermostat which merely serves as a piece of accessory equipment, it would be prohibitive from an economic point of view.

It is accordingly an object of the present invention to provide a device of the character indicated which avoids the drawbacks and disadvantages of devices heretofore proposed.

In accordance with the present invention there is provided an evaporator thermostat in which the adjustment spring, which is active under normal operation only, is entirely locked during the defrosting period and is replaced by an auxiliary spring.

This construction ensures that only the auxiliary spring is active during the defrosting period. Therefore, this auxiliary spring, which can also be adjusted, solely determines the cut-in temperature at the termination of the defrosting period. Thus, the cut-in temperature is entirely independent of the adjustment of the adjustment spring. Therefore, the defrosting temperature will remain constant at any adjustment of the temperature range for the thermostat. It will not be necessary for the two springs to be matched. Further, a specific auxiliary spring can be employed for any desired evaporator thermostat, irrespective of the kind of adjustment spring with which the thermostat is fitted. Since no consideration is required as to tight tolerances, very inexpensive springs can be employed.

The present invention provides a very simple solution to the problem in a construction employing a fixed stop which couples an auxiliary trip lever, upon which acts the thermostatic element, to that lever, i.e. the adjustment lever, which is actuated by the adjustment spring. The auxiliary spring is coupled beween the aforesaid adjustment lever and a trip lever. From that moment when the adjustment lever bears against the stop, the adjustment spring is locked, and only the auxiliary spring is active.

To ensure that the adjustment spring during normal operation is not influenced to any perceptible degree by the auxiliary spring, no locking of the auxiliary spring is normally required, and it will be sufficient to have the auxiliary spring more rigid than the adjustment spring. In general, a spring which defines a defrosting temperature of, for example, plus 6° C. will give sufficient rigidity compared to an ordinary adjustment spring. It is preferable to couple the release lever to the coupling element actuated by the defrosting button. This causes the defrosting button to remain depressed during the entire defrosting period. Thus, the trip lever acts as a detent to the defrosting button.

The arrangement can be so designed that the adjustment lever, is coupled in conventional manner to an electric switch, and the coupling element, actuated by the trip lever and the defrosting button, is coupled to a second electric switch with two stable positions. Employment of the second electric switch offers the possibility of inserting additional facilities for speeding up the defrosting process, for example through electric heating or a reversing valve for supplying the warm refrigerant to the evaporater during the defrosting period, which, heretofore, has been possible only by the employment of an additional thermostatic operating element for the defrosting temperature. The construction of the invention also offers the advantageous possibility of letting the adjustment lever and the coupling element, actuated by the trip lever and the defrosting button, actuate the same electric switch, through which, by simple means, a corresponding inexpensive construction is achieved. It should be noted in particular that, in spite of this relatively simple construction, none of the above-mentioned drawbacks in conventional evaporator thermostats will appear.

Figure 4:
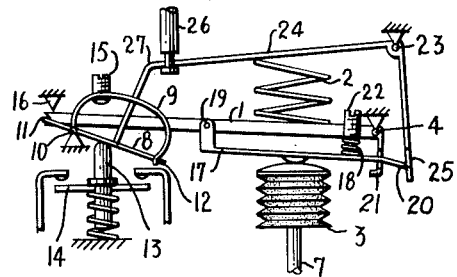
Figure 5:
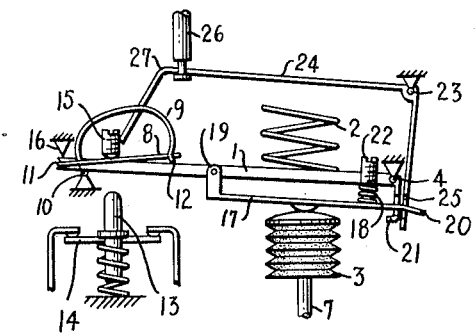
Figure 6:
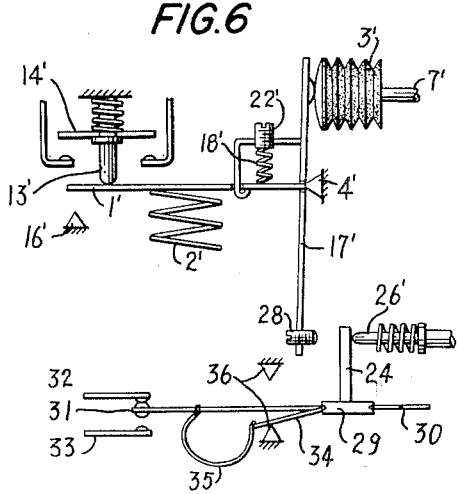

The subject of the present invention is further characterized by the following description of two illustrative embodiments taken in connection with the accompanying drawing, wherein:

FIGS. 1 to 5 show diagrammatically a first embodiment in which a single electric switch is controlled, the parts being shown in different operating positions; and FIG. 6 is a similar view of a second embodiment in which two electric switches are controlled.

The construction shown in FIGURES 1 to 5 embodies a plurality of conventional components. At one side, the adjustment lever 1 is actuated by an adjustment spring 2, and at the other side, it is actuated by the thermostatic operating element, in the present case a diaphragm chamber 3. The adjustment lever 1 is suspended at one end in a fixed bearing 4. The adjustment spring 2 can be adjusted by means of the lever 5, actuated by the externally-adjustable control curve 6. The diaphragm chamber 3 is fed via the capillary tube 7 which is connected to a thermal phial in the evaporator (not shown).

In conventional manner, the adjustment lever 1 forms part of a three-lever system, to which also belong the center lever 8 and the angular lever 9. The latter is supported in a fixed bearing 10. The bearings 11 and 12 between the levers are movable. The center lever 8 actuates a plunger 13, which at one end operates the switch 14, in this case consisting of two contacts and a yoke. By means of the screw 15, which forms a limiting stop for the center lever 8, the temperature difference, i.e., the difference between cut-in and cut-out temperature, can be adjusted.

The system, as described so far, enables the three-lever arrangement, upon reaching a certain upper limit temperature, to snap over to one stable position, thereby closing the switch 14, and upon falling temperature to snap over to the other stable position at a certain lower limit temperature, thereby opening the switch 14 again.

According to the invention, there is but one stop 16, which limits the upward motion of the adjustment lever 1, thus rendering the adjustment spring inactive. The diaphragm chamber 3 does not actuate the adjustment lever 1 directly, but actuates a trip lever 17. Between the adjustment lever 1 and the trip lever 17 is coupled an auxiliary spring 18. At 19 the trip lever is coupled at one end to the adjustment lever 1, and is supported at the other end with an extension piece 20 in a supporting pin 21 on the adjustment lever 1. The auxiliary spring 18 can be adjusted by means of the screw 22.

In addition, there is a coupling element in the form of a bell crank lever 24 pivoted at 23. One end of this lever is provided with a recess 25, through which under normal operating conditions runs the extension 20 on the trip lever 17. At the same time, the coupling element is engaged by the defrosting button 26. Upon depressing the button, the end portion 27 of the lever will actuate the center lever 8.

The sequence of operation is as follows:

Under normal operation as shown in FIG. 1, the coupling element 24 is entirely inactive. Because of the rigidity of the auxiliary spring 18, the trip lever 17 bears against the supporting pin 21 on the adjustment lever 1. The adjustment lever 1, the trip lever 17, and the auxiliary spring 18 together constitute a rigid system, so that only the adjustment spring 2 and the diaphragm chamber 3 will work against each other.

Figure 2:
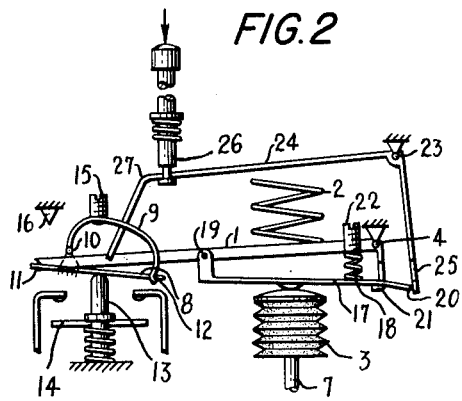

Upon depressing the defrosting button 26, as shown in FIG. 2, the end portion 27 of the coupling element 24 is now, independent of the position of the lever system, lowered so much, that were the switch 14 not open, the center lever 8 would cause it to open. At the same time, the extension 20 on the trip lever 17 has slipped out of the recess 25 on the coupling element 24, and locks the coupling element and the defrosting button in this defrosting position.

Figure 3:
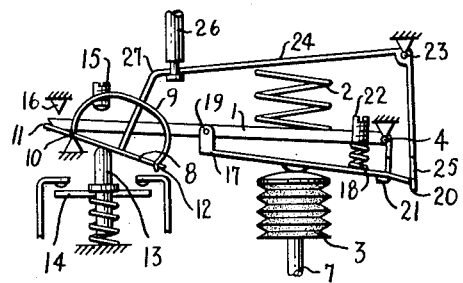

As the temperature now rises, the three-lever system, as shown in FIG. 3, cannot snap back into the cut-in position, because the center lever 8 is retained by the end portion 27 on the coupling element 24.

Upon an additional increase of temperature, the adjustment lever 1, as shown in FIG. 4, will eventually bear against the stop 16. From this moment, the adjustment spring 2 is inactive. Now, a further expansion in the diaphragm chamber can operate only on the auxiliary spring 18. This spring is gradually compressed, causing the trip lever 17 to move upwards. Having reached the defrosting temperature, the extension 20 on the trip lever 17 will be in the area of the recess 25, so that the coupling element 24, through the effect of the spring coupled to the defrosting button 26, can resume its normal position.

FIG. 5 illustrates that moment of the sequence. It will be seen that the three-lever system immediately snaps back to the upper stable position, causing the switch 14 to close. Until the defrosting button is actuated again, the normal condition for cut-in and cut-out at temperature limits, determined by the control curve 6 and the screw 15, prevail.

FIG. 6 shows another embodiment in which two electric switches are operated. Components corresponding to those used in the first embodiment are indicated with the same reference numeral which have been primed. The adjustment lever 1', actuated by the adjustment spring 2', operates the switch 14' directly through the plunger 13'. The diaphragm chamber 3', fed via the capillary tubing 7', operates the adjustment lever 1' through the trip lever 17', the adjustment screw 22', and the comparatively rigid auxiliary spring 18'. In the present case, both levers 1' and 17' can be pivoted independently of each other in the same fulcrum 4'. Therefore, under normal operation, the switch 14' is opened or closed in accordance with the volume in the diaphragm chamber 3'.

Further, through another adjustment screw 28', the auxiliary lever 17' actuates the coupling element 24' in a direction opposite to that of the adjustment knob 26'. The adjustment is so chosen that the auxiliary lever will not be active at this point until the adjustment lever 1' bears against the stop 16'. The coupling element 24' is provided with a double recess 29, which at one side engages a leaf spring lever 30, fixed at its bottom end and fitted with a movable contact 31 at its upper end. The movable contact 31 operates together with the fixed contacts 32 and 33, respectively. At its other side, the double recess 29 engages a lever 34. Both levers are connected together by means of the Omega-shaped spring 35. Because of this, the lever system 30, 34 and 35 has two stable positions, depending upon the position of the double recess 29, and the final position is determined by the stop 36.

Suppose the fixed contact 32 is inserted in the connection lead of the compressor motor, and that the fixed contact 33 is able to switch on electric heating, then the movable contact 31, when being actuated through the defrosting button 26', will change position, thereby cutting out the motor—irrespective of the position of the normal motor switch 14—and switching on electric heating. This condition remains until the diaphragm chamber 3' has turned the adjustment lever 1' against the stop 16', and thereupon forced the trip lever 17' so far against the force of the auxiliary spring 18' that the screw 28 has carried the coupling element 24' back to the position shown in FIG. 6. This instant of coupling, which determines the termination of the defrosted period, can be exactly fixed to the desired value of temperature by adjusting the screw 22'.

The fixed contact 32 can also be left unemployed, and a solenoid can be connected via the fixed contact 33, which arrangement permits the warm refrigerant to be led directly into the evaporator. In this case, the compressor motor is not switched off during the defrosting period. Also in this case, the solenoid valve is first closed, and the normal conditions do not set in until the trip lever 17' causes the lever system 30, 34 and 35 to switch over.

I claim:

1. In a thermostatic apparatus comprising, a switch having a switch element movable to a first position for opening a switch and to a second position for closing the switch, means biasing said switch element to said second position, thermostat means for actuating said switch means comprising a first means for moving said switch element to said first position, an adjusting spring acting on said first means in a direction to move said switch element toward said first position, a temperature-responsive device acting on said first means for actuating said first means against the action of said adjusting spring to cause release of said switch element for movement to its second position to close the switch, means for adjusting said adjusting spring to variably set the temperature at which said temperature-responsive device causes said switch element to open the switch, an auxiliary spring acting on said first means, coupling means for alternatively controlling the temperature at which said switch is opened and closed from said adjusting spring and from said auxiliary spring independently of said adjusting spring, said coupling means having means for rendering the adjusting spring ineffective when said switch element is in its second position and for rendering said auxiliary spring responsive to said temperature-responsive device to control the temperature at which said adjusting spring closes the switch regardless of the setting of said adjusting spring means selectively operable to render said coupling means effective, said coupling means comprising means rendered effective under control of said temperature-responsive device and said auxiliary spring for rendering the auxaliary spring ineffective and simultaneously rendering the first means and adjusting spring effective for actuating said switch element to its first position.

2. In a thermostatic and defrosting control apparatus for refrigerators and the like comprising, a switch having a switch element movable to a first position for opening a switch and to a second position for closing the switch, means biasing said switch element to said second position, thermostat means comprising a pivoted lever for operating said switch element to said first position, an adjusting spring acting on said lever for urging said lever in a direction for actuating said switch element to said first position, a temperature-responsive device comprising means acting on said lever for actuating said pivoted lever against the action of said adjusting spring to cause release of said switch element for operation to its second position, means for adjusting said adjusting spring to variably set the temperature at which said temperature-responsive device causes said lever to open the switch, an auxiliary spring acting on said lever, coupling means for alternatively controlling the temperature at which said switch is opened and closed from said adjusting spring and from said auxiliary spring independently of said adjusting spring, said coupling means having means for rendering the adjusting spring effective when said switch element is in its second position and for rendering said auxiliary spring responsive to said temperature-responsive device to control the temperature at which said adjusting spring closes the switch regardless of the setting of said adjusting spring, means selectively operable to render said coupling means effective, said coupling means comprising means rendered effective under control of said temperature-responsive means and said auxiliary spring for rendering the auxiliary spring ineffective and simultaneously rendering the adjusting spring effective to snap the said lever into a position actuating said switch element to its first position.

3. In a thermostatic and defrosting control apparatus for refrigerators and the like comprising, a switch having a switch element movable to a first position for opening a switch and to a second position for closing the switch, means biasing said switch element to said second position, thermostat means comprising a pivoted lever for operating said element to said second position, an adjusting spring acting on said lever for urging said lever in a direction for actuating said switch element to said first position, a bellows operable in response to temperature variations acting on said lever for actuating said pivoted lever against the action of said adjusting spring to cause release of said switch element for operation to its second position, means for adjusting said adjusting spring to variably set the temperature at which said bellows causes said lever to open said switch, an auxiliary spring acting on said lever, coupling means for alternatively controlling the temperature at which said switch is opened and closed from said adjusting spring and from said auxiliary spring independently of said adjusting spring, said coupling means having means for rendering the adjusting spring ineffective when said switch element is in its second position and for rendering said auxiliary spring responsive to said bellows to control the temperature at which said adjusting spring opens the switch regardless of the setting of said adjusting spring means selectively operable to render said coupling means effective, said coupling means comprising means rendered effective under control of said bellows and said auxiliary spring for rendering the auxiliary spring ineffective and simultaneously rendering the adjusting spring effective to move the said lever into a position actuating said switch element to its first position.

4. In a thermostatic defrosting control apparatus according to claim 3 in which coupling means comprises another pivoted lever for operably coupling the bellows and said auxiliary spring.

5. In a thermostatic defrosting control apparatus according to claim 4, in which said coupling means comprises a trip lever pivotally connected with said first mentioned lever with said auxiliary spring acting between said trip lever and said first mentioned lever, said trip lever being operable by said bellows against the force of said auxiliary spring to cause snap action of the first mentioned lever for actuating said switch element for opening said switch.

6. In a thermostatic and defrosting control apparatus for refrigerators and the like comprising, a switch having a switch element movable to a first position for opening a switch and to a second position for closing the switch, means biasing said switch element to said second position, thermostat means comprising a pivoted lever for operating said switch element to said first position, an adjusting spring acting on said lever for urging said lever in a direction for actuating said switch element to said first position, a temperature-actuated device acting on said pivoted lever for actuating said pivoted lever against the action of said adjusting spring to cause release of said switch element for operation to its second position, means for adjusting said spring to variably set the temperature at which said temperature-actuated device causes said lever to open the switch, an auxiliary spring acting on said lever, coupling means for alternatively controlling the temperature at which said switch is opened and closed from said adjusting spring and from said auxiliary spring independently of said adjusting spring, said coupling means having means for rendering the adjusting spring ineffective when said switch element is in its second position and for rendering said auxiliary spring responsive to said temperature-actuated device to control the temperature at which said adjusting spring opens the switch regardless of the setting on said adjusting spring, means selectively operable to render said coupling means effective, said coupling means comprising means rendered effective under control of said temperature-actuated device and said auxiliary spring for rendering the auxiliary spring ineffective and simultaneously rendering the adjusting spring effective to snap the said lever into a position actuating said switch element to its first position and means to variably adjust the auxiliary spring to set the temperature at which said switch is opened when under control of said auxiliary spring independently of said adjusting spring.

7. In a thermostatic and defrosting control apparatus for refrigerators and the like comprising, a switch having a switch element movable to a first position for opening a switch and to a second position for closing the switch, means for biasing said switch element to said second position, thermostat means comprising a pivoted lever for operating said switch element to said first position, an adjusting spring acting on said lever for urging said lever in a direction for actuating said switch element to said first position, a temperature-actuated device acting on said lever for actuating said pivoted lever against the action of said adjusting spring to cause release of said switch element for operation to its second position, means for adjusting said adjusting spring to variably set the temperature at which said temperature-actuated device causes said lever to release said switch element to open the switch, an auxiliary spring acting on said lever, coupling means for alternatively controlling the temperature at which said switch is opened and closed from said adjusting spring and from said auxiliary spring independently of said adjusting spring, said coupling means having means for rendering the adjusting spring ineffective when said switch element is in its second position and for rendering said auxiliary spring responsive to said temperature-actuated device to control the temperature at which said adjusting spring opens the switch regardless of the setting of said adjusting spring, a defrost button operably connected to said coupling means selectively operable to render said coupling means effective, said coupling means comprising means rendered effective under control of said temperature-actuated means and said auxiliary spring for rendering the auxiliary spring ineffective and simultaneously rendering the adjusting spring effective to snap the said lever into a position actuating said switch element to its first position.

8. In a thermostatic and defrosting control apparatus according to claim 7, in which said auxiliary spring is stronger than said adjusting spring.

References Cited in the file of this patent
UNITED STATES PATENTS

| | | |
|---|---|---|
| 1,969,304 | Grooms | Aug. 7, 1934 |
| 2,769,311 | Duncan | Nov. 6, 1956 |
| 2,918,804 | Iglehart | Dec. 29, 1959 |